United States Patent [19]

Tung et al.

[11] Patent Number: 4,631,313

[45] Date of Patent: Dec. 23, 1986

[54] PROCESS FOR THE POLYMERIZATION OF MIXTURES OF CIS AND TRANS-ISOMERS OF 1,3-PENTADIENE IN THE PRODUCTION OF BLOCK COPOLYMERS

[75] Inventors: Lu H. Tung; Jerald A. Griggs, both of Midland, Mich.

[73] Assignee: The Dow Chemical Company, Midland, Mich.

[21] Appl. No.: 749,074

[22] Filed: Jun. 26, 1985

[51] Int. Cl.[4] ............................................. C08F 297/04
[52] U.S. Cl. .................................... 525/250; 525/271; 525/314
[58] Field of Search ........................ 525/250, 271, 314; 526/87, 173, 340, 340.2

[56] References Cited

U.S. PATENT DOCUMENTS 3,147,242 9/1964 Stearns ............................ 526/340.2
4,152,370 5/1979 Moczygemba ...................... 525/314

FOREIGN PATENT DOCUMENTS 888624 1/1962 United Kingdom ................ 525/314

Primary Examiner—Wilbert J. Briggs, Sr.
Attorney, Agent, or Firm—Michael L. Winkelman

[57] ABSTRACT

An improved method for the polymerization of mixtures of mixed cis and trans-isomers of 1,3-pentadiene in the production of block copolymers. By continuously or incrementally adding a cis-isomer of 1,3-pentadiene polymerization promoter, using a hydrocarbon solvent with no aprotic solvents of a polar nature and not exceeding specified temperature ranges, the cis-isomer of 1,3-pentadiene is polymerized, resulting in a greater 1,3-pentadiene polymerization yield. The polymerization promoter is a vinyl-substituted aromatic monomer, for example styrene.

7 Claims, No Drawings

PROCESS FOR THE POLYMERIZATION OF MIXTURES OF CIS AND TRANS-ISOMERS OF 1,3-PENTADIENE IN THE PRODUCTION OF BLOCK COPOLYMERS

BACKGROUND OF THE INVENTION

1. Field of the Invention

This invention relates to an improved process for the polymerization of mixtures of cis and trans-isomers of 1,3-pentadiene in the production of block copolymers. More specifically this process permits better utilization of the cis-isomer of 1,3-pentadiene, thus increasing the amount of total pentadiene polymerized, by continuously or incrementally adding a polymerization promoter consisting essentially of a vinyl-substituted aromatic monomer using a hydrocarbon solvent having no added aprotic solvents of a polar nature, such as tetrahydrofuran, and not exceeding a polymerization temperature of about 60 degrees C. in the absence of added polymerization promoter or about 70 degrees C. in the presence of added polymerization promoter.

2. Description of The Prior Art

The prior art contains many references to block copolymers of vinyl aromatics and conjugated dienes and processes for preparing them. Butadiene and isoprene are the most commonly taught conjugated dienes. 1,3-pentadiene (piperylene) is also often included in the same grouping as an acceptable conjugated diene monomer. Poly(1,3-pentadiene) is known to be more ozone resistant than other diene polymers, for example, polybutadiene or polyisoprene.

U.S. Pat. No. 3,030,346 teaches initial charging of both conjugated diene and vinyl-substitued aromatic compound in the presence of a hydrocarbon diluent and organolithium compound and effecting the polymerization at two temperature levels, to 100 degrees Fahrenheit (F.), initially to copolymerize the conjugated diene and part of the vinyl-substituted aromatic, then 115 degrees F. to 140 degrees F. to polymerize the rest of the vinyl-substitued aromatic compound. The period of time at the first temperature must be sufficient to polymerize at least 85 percent of the conjugated diene or a minimum time period of 6 hours.

1,3-pentadiene has both cis and trans-isomers with the trans-isomer being the more reactive of the two isomers. 1,3-pentadiene refined from petroleum crude contains about ⅔ trans-isomer and about ⅓ cis-isomer. With only a 2 degree centigrade (C.) difference in boiling points (cis-isomer 44 degrees C., trans-isomer 42 degrees C.) the separation of these two isomers is difficult and commerically uneconomical.

R. P. Shatalov, L. V. Kovtunenko and N. I. Simirnov (ISSLEDOVANIA V OBLASTI FIZIKI I KHIMII KAUCHUKON I REZIN. LENINGRAD. V. (3)25-9(1973)) studied various copolymer based on piperylene using piperylene containing 99 weight percent trans-isomer. Since the trans-isomer is significantly more reactive than the cis-isomer, Shatalov et al.'s use of only the trans-isomer is not unexpected. If a mixture of isomers had been used, an inordinate amount of time would be required to complete polymerization of the mixed isomer mixture.

Traditionally, to those skilled in the art of anionic block copolymerization, all monomers are expected to be totally consumed during the polymerization. Use of a mixed isomer mixture would require an extreme amount of time to totally consume the cis-isomer.

Increasing the temperature to increase the rate of cis-isomer polymerization results in premature chain termination. This premature chain termination means the desired block structure will not be obtained in acceptable yields.

The addition of polar additives, such as tetrahydrofuran, other ethers or tertiary amines, also results in premature chain termination, and undesirable polymer microstructure and does not promote the overall 1,3-pentadiene polymerization rate. While styrene does copolymerize with both isomers of 1,3-pentadiene, the fact that a vinyl-substituted aromatic monomer copolymerizes with the cis-isomer allows use of a mixed isomer mixture of 1,3-pentadiene for polymerization.

Large residues of 1,3-pentadiene would interfere with the polymerization of a glassy styrenic end block. Use of a polymerization promoter, such as styrene, during the formation of an elastomeric block containing 1,3-pentadiene allows the use of a monofunctional organolithium initiator to produce an ABC triblock copolymer, where A and C are non-identical glassy end blocks and B is an elastomeric center block, and the use of a difunctional or multifunctional organolithium initiator to polymerize the elastomeric center block then adding a monomer or monomers and polymerizing the end blocks. Also, by controlling the rate and time of addition of the polymerization promoter, tapered block copolymers, initially rich in 1,3-pentadiene, then becoming increasingly rich in styrene, can be produced.

It is an object of this invention to provide a method of making triblock copolymers, using organolithium initiators, having an elastomeric center block polymerized from a mixed isomer mixture of 1,3--pentadienes using a cis-isomer 1,3-pentadiene polymerization promoter.

It is another object of this invention to provide a method of making tapered block copolymers from vinyl-substituted aromatic compounds and a mixed isomer mixture of 1,3-pentadiene utilizing a cis isomer 1,3-pentadiene polymerization promoter.

It is still another object of this invention to provide block copolymers containing 1,3-pentadiene that have improved heat and exposure stability.

SUMMARY OF THE INVENTION

In preparing block copolymers from vinyl-substituted aromatic monomers and conjugated diene monomers in the presence of heat, a hydrocarbon solvent and an organolithium initiator, one of the conjugated diene monomers being a mixture of cis and trans-isomers of 1,3-pentadiene an improvement has been discovered. The improvement comprises polymerizing the mixture of cis and trans-isomers of 1,3-pentadiene in the presence of a hydrocarbon solvent having no added aprotic solvents of a polar nature, a cis-isomer of 1,3-pentadiene polymerization promoter consisting essentially of a vinyl-substituted aromatic monomer continuously or incrementally added during the 1,3-pentadiene polymerization and a 1,3-pentadiene polymerization temperature not exceeding about 60 degrees C. in the absence of added polymerization promoter or about 70 degrees C. in the presence of added polymerization promoter.

DETAILED DESCRIPTION OF THE INVENTION

The present invention concerns block copolymer containing a polymerized mixed isomer mixture of 1,3-pentadiene and a method for preparing these block copolymers utilizing a cis-isomer of 1,3-pentadiene polymerization promoter. This polymerization promoter consists essentially of a vinyl-substituted aromatic monomer.

Vinyl-substituted aromatic monomers useful in the production of these block copolymers include, but are not limited to, styrene, p-methylstyrene, m-methylstyrene, α-methylstyrene, t-butylstyrene, and p-methyl-α-methylstyrene.

Other conjugated dienes useful in the block, copolymers of the present invention include butadiene and isoprene. These may be combined with 1,3-pentadiene or the vinyl-substitued aromatic monomers useful in the present invention.

The method of preparing the block copolymers of the present invention utilizes mono, di or multifunctional organolithium initiators. The preferred organolithium initiators are n or s-butyllithium. Other organolithium initiators such as ethyllithium and propyllithium are acceptable initiators. Di or multifunctional organolithium initiators are described in U.S. Pat. Nos. 4,196,153; 4,196,154; 4,201,729; and 4,205,016 which are incorporated by reference into this specification.

Preferred hydrocarbon solvents are toluene, benzene or cyclohexane. Aliphatic hydrocarbons such as hexane, heptane or mixtures of aliphatic or other parafinic or olefinic hydrocarbons, such as octene may also be used.

The hydrocarbon solvent should be 50 volume percent or more of the reaction mixture to prevent viscosity problems.

Aprotic solvents of a polar nature eg. tetrahydrofuran, may not be added during polymerization of 1,3-pentadiene as these solvents will prevent formation of the desired block structure. The polymerized vinyl-substitued aromatic blocks in the block copolymer may be in blocks or may vary in composition, eg. tapered, and thus have more than one glass temperature, but the principal glass temperature should be above 60 degrees C. The compostion of the 1,3-pentadiene containing elastomeric block or blocks also need not be uniform. The elastomeric composition may also be tapered or in blocks, but the principal glass temperature should be less than 15 degrees C.

The proportion of polymerized 1,3-pentadiene in the block copolymer may range from about 10 to about 90 weight percent based on total block copolymer weight.

In all polymerization steps air and moisture must be excluded. A pressure above atmospheric pressure in the reaction vessel may be useful, but is not required.

The practice of this invention is illustrated by reference to the following examples which are intended to be representative rather than restrictive of the scope of the present invention.

EXAMPLES

The 1,3-pentadiene monomer employed in all of the examples contained 34 weight percent cis-isomer, 65 weight percent trans-isomer and 1 weight percent inert hydrocarbons. The mixed isomer mixture of 1,3-pentadiene is purified unless otherwise noted by passing the mixture twice through an activated alumina column and then subsequently vacuum distilling after standing overnight with calcium hydride at room temperature.

HEAT STABILITY TEST

The block copolymers are subjected to 200 degrees centigrade, employing a melt indexer as the measuring device for various periods of time. The melt flow rate (MFR) is calculated from the amount of polymer extruded from the melt indexer in accordance with Schedule G of the ASTM test D-1238. Five minutes was required heating time for the polymer to reach measurement temperature. The percent change of melt flow rate was calculated using the 5 minute melt flow rate as a base.

Compression Molding

The block copolymers are compression molded into sheets about 30 mils (0.762 mm) thick and then cut into suitable shapes for tensile testing on standard testing machines.

EXAMPLE 1

A difunctional organolithium polymerization initiator solution is prepared by reacting 0.170 gram of 1,3-bis(1-phenylethenyl)benzene in 22.5 milliliters of toluene with 2.4 milliliters of 0.552 normal secondary-butyllithium solution of cyclohexane at room temperature for a period of about 1 hour. The preparation of such difunctional organolithium initiators is described at length in U.S. Pat. No. 4,196,154, the teachings of which have been incorporated by reference thereto. One milliliter of isoprene is added and the solution heated to 70-75 degrees centigrade for a period of 10 minutes. A nitrogen purged 1-liter glass reactor is charged with 400 milliliters of dry toluene, 70 milliliters of the mixed isomer mixture of 1,3-pentadiene and 1 milliliter of styrene. The reaction mixture is heated to 60 degrees centigrade and at the end of the 10 minutes heating period, the difunctional organolithium initiator is added to the 1 liter reactor. Polymerization is permitted to proceed for a period of 15 minutes. At this time, continual addition of styrene is begun at a rate of 1 milliliter per hour for a period of 3 hours. At the end of the 3 hour period, the temperature of the reaction mixture is raised to 65 degrees centigrade and the styrene continual addition rate increased to 15 milliliters per hour for a period of two hours. Thirty minutes after the styrene addition has stopped and the mixture maintained at 65 degrees centigrade, glacial acetic acid is added to terminate any active lithium present in the system. The resultant polymer is recovered by precipitation in methanol. The polymer is subsequently dried under vacuum. The recovered polymer is a triblock copolymer of ABA configuration wherein A is a block of 1,3-pentadiene/styrene copolymer rich in styrene; and B is a block of 1,3-pentadiene/styrene copolymer but rich in 1,3-pentadiene. During the course of polymerization, analyzed by gas chromatography with the following results:

| Time minutes | Trans-1,3-pentadiene moles/liter | Cis-1,3-pentadiene moles/liter | Styrene moles/liter |
| --- | --- | --- | --- |
| 0 | .97 | .51 | .01 |
| 105 | .67 | .42 | .01 |
| 195 | .40 | .36 | .02 |
| 345 | .04 | .01 | .06 |

Gas chromatography analysis indicates that both trans and cis-isomers of the 1,3-pentadiene enter into the polymerization.

Heat stability is measured and employing the general procedure previously described and the results are as follows:

| Time | 5 minutes | 10 minutes | 20 minutes | 40 minutes | 60 minutes |
|---|---|---|---|---|---|
| MFR | 7.5 | 7.1 | 7.4 | 7.5 | 7.8 |
| % change | | −4.2 | −.9 | 0 | +5.1 |

As can be seen by the percent change in the melt rate the polymer of the present invention does not appear to crosslink, which would result in a decreased melt flow rate or degrade severely, which would cause an increased melt rate, at 200° C. for a period of 60 minutes. Compression molded samples of the block copolymers have a rupture strength of 1050 pounds per square inch and an ultimate elongation of 956 percent.

EXAMPLE 2

A difunctional organolithium initiator solution is prepared under a nitrogen atmosphere by reacting a solution of 0.156 grams of 1,3-bis(1-phenylethenyl)benzene dissolved in 22.3 milliliters of toluene with 2.2 milliliters of 0.552 normal secondary-butyllithium solution is cyclohexane at room temperature for a period of 1 hour. One milliliter of isoprene is added and the solution heated to a temperature of 70–75 degrees centigrade for a period of 10 minutes. At the end of the 10 minute period, the initiator solution is charged to a nitrogen purged 1 liter glass polymerization reactor containing a mixture of 400 milliliters of dry toluene, 70 milliliters of the mixed isomer mixture of 1,3-pentadiene and 0.5 milliliters of styrene. At the time of addition of the initiator, the contents of the 1-liter polymerization reactor are at a temperature of 60 degrees centigrade. Thirty minutes after the addition of the initiator, styrene is continually added at a rate of about 1 milliliter per hour for a period of 3 hours. At the end of the 3 hour period, the temperature of the reactor contents is increased to 65 degrees centigrade and the styrene addition rate is increased to 15 milliliters per hour for a period of 2 hours. When the addition of styrene is stopped, the mixture is maintained at 65 degrees centigrade for an additional hour and glacial acetic acid is added to terminate the polymerization. The polymer is recovered by precipitation in methanol and was vacuum dried. The yield of polymer is almost quantitative and the recovered polymer is a triblock copolymer of the structure ABA wherein A is a block of copolymer of styrene and 1,3-pentadiene that is rich in styrene and B is a block of styrene and 1,3-pentadiene copolymer rich in pentadiene. Heat stability is measured in accordance with the procedure previously described and the results are as follows:

| Time | 5 minutes | 10 minutes | 20 minutes | 40 minutes | 60 minutes |
|---|---|---|---|---|---|
| MFR | 1.21 | 1.26 | 1.12 | 1.01 | .87 |
| % change | | +4.1 | −7.0 | −16.5 | −28.1 |

A compression molded sample of the polymer shows a tensile strength at break of 1235 pounds per square inch and an ultimate elongation of 1392 percent.

EXAMPLE 3

A 1-liter nitrogen purged glass polymerization reactor is charged with 400 milliliters of dry toluene, 20 milliliters of purified styrene and 1.6 milliliters of 0.519 normal secondary-butyllithium in cyclohexane solution. The contents of the reactor are maintained at 50 degrees centigrade for 45 minutes. Seventy milliliters of a mixture of mixed isomers of 1,3-pentadiene is purified by passing the mixture twice through an activated alumina column and vacuum distilling in the presence of a small amount of s-butyllithium and is added to the reactor. The polymerization temperature is raised to 60 degrees centigrade and styrene is added continually at the rate of 1 milliliter per hour for 3 hours. The rate of styrene addition is then increased to 20 milliliters per hour and the polymerization temperature is increased 65 degrees centigrade. After a period of 30 minutes of adding styrene at the rate of 20 milliliters per hour, continual addition is stopped and 22 milliliters of styrene are added to the reaction mixture. The reaction mixture is held at 65 degrees for a period of 2 hours after the addition of the 22 milliliters of styrene. The polymerization is ended by adding glacial acetic acid, recovering the polymer by precipitating in methanol and vacuum drying. The resultant block copolymer has a structure of ABCD wherein A is a polystyrene block and B, C and D are blocks of styrene and 1,3-pentadiene copolymer with increasing amounts of styrene copolymer in blocks B, C and D. The reaction mixture is sampled during the polymerization at various times wherein time 0 is taken as the time of addition of the secondary-butyllithium. Samples are analyzed by gas chromatography with the following results:

| Time hours: minutes | Trans-1,3-pentadiene moles/liter | Cis-1,3-pentadiene moles/liter | Styrene moles/liter |
|---|---|---|---|
| 0 | 0 | 0 | .42 |
| 0:45 | 1.03 | .54 | .02 |
| 2:15 | .63 | .47 | .01 |
| 3:45 | .32 | .36 | .01 |
| 4:15 | .20 | .27 | .14 |
| 4:45 | .04 | .05 | .07 |
| 6:15 | 0 | 0 | 0 |

The composition of the resultant polymer is 51.3 weight percent styrene and 48.7 weight percent 1,3-pentadiene.

A compression molded sample of the polymer has a tensile strength of 2160 pounds per square inch. The ultimate elongation is 280 percent.

Heat stability is evaluated by melt flow rate (MFR) as previously described with the following results:

| Time | 5 minutes | 10 minutes | 20 minutes | 40 minutes | 60 minutes |
|---|---|---|---|---|---|
| MFR | 7.0 | 7.3 | 8.3 | 8.8 | 9.5 |
| % change | | +4.3 | +19.4 | +27.1 | +36.7 |

COMPARATIVE EXAMPLE A

A 1 liter glass polymerization reactor is purged with dry nitrogen and charged with 400 milliliters of dry toluene and 20 milliters of purified styrene. The reaction mixture is degassed and heated to 50 degrees centigrade. When the reaction mixture reaches 50 degrees centigrade, 1.9 milliliters of a 0.547 normal solution of secondary-butyllithium in cyclohexane is added. The reaction mixture immediately acquires a red coloration. Forty-five minutes after the addition of the secondary-butyllithium, 78 milliliters of the mixed isomer mixture of 1,3-pentadiene is added.

On addition of the 1,3-pentadiene to the reaction mixture, the color changes to light yellow and the mixture is maintained at a temperature of 50 degrees centigrade for a period of four hours. At the end of this period, 2.5 milliliters of a solution of 0.6 grams of phenylbenzoate in 10 milliliters of toluene is added as a coupling agent. The reaction mixture, after addition of the phenylbenzoate is maintained at about 50 degrees centigrade for a period of 1 hour. At the end of this period, 0.5 milliliters of glacial acetic acid is added to inactivate lithium ions present. The polymer is recovered by precipitation in methanol and subsequently dried to vacuum. A trace amount of 3,5--di-tertiary butyl-4-hydroxy toluene (BHT) is added to the polymer as a stabilizer. The resulting polymer is triblock copolymer of ABA structure, wherein A is a block of polystyrene and B is a block of poly(1,3--pentadiene). This is designated as a SPS triblock copolymer.

The reaction is sampled by withdrawing during the polymerization of the mixed isomer mixture of 1,3-pentadiene samples which are analyzed by gas chromatography for trans-1,3-pentadiene and cis-1,3-pentadiene. The results are as follows:

| Time hours | Trans-1,3-pentadiene moles/liter | Cis-1,3-pentadiene moles/liter |
|---|---|---|
| 0 | 1.00 | .55 |
| 1 | 0.85 | .57 |
| 2 | 0.67 | .56 |
| 4 | 0.44 | .53 |

The results indicate that only the trans-isomer of 1,3-pentadiene is being incorporated into the triblock copolymer structure.

EXAMPLE 4

A difunctional organolithium polymerization initiator solution is prepared by reacting 0.177 grams of 1,3-bis(1-phenylethenyl)benzene in 12.6 milliliters of toluene with 1.9 milliliters of a 0.532 normal secondary-butyllithium solution in cyclohexane. The reaction is conducted under nitrogen at room temperature. A 1 liter glass polymerization reactor is nitrogen purged and charged with 400 milliliters of dry toluene, 48 milliliters of purified mixed isomer of 1,3-pentadiene and 7 grams of 1,3-butadiene. The reaction mixture is heated to about 65 degrees centigrade and the difunctional organolithium initiator solution is added thereto. About 2 hours after the addition of the difunctional initiator 10 milliliters of styrene are added. After an additional 2 hours following the addition of styrene, 20 milliliters of styrene are added. An hour after the second styrene addition, the polymerization is terminated by the addition of 1 milliliter of glacial acetic acid. The polymer is recovered from solution by precipitation in methanol and is subsequently vacuum dried. The polymerization is sampled at various periods of time with time 0 being the time of addition of the difunctional initiator. The samples are analyzed by gas chromatography with the following results:

| Time hour | Butadiene moles/liter | Trans-1,3-pentadiene moles/liter | Cis-1,3-pentadiene moles/liter | Styrene moles/liter |
|---|---|---|---|---|
| 0 | .28 | .68 | .36 | 0 |
| 2 | .02 | .32 | .29 | .19 |
| 3 | .01 | .10 | .14 | .02 |
| 4 | 0 | .05 | .11 | .33 |
| 5 | 0 | 0 | 0 | .09 |

The results of the gas chromatographic analysis indicate that both the trans and cis-isomers of 1,3-pentadiene are copolyermized. It is believed that the resultant polymer has a complex structure which can be approximately represented by the configuration ACPBCA wherein B is a polybutadiene block; P is poly(1,3-pentadiene) block; C is a styrene 1,3-pentadiene copolymer block with a varying composition; and A is similar to C but richer in styrene than C.

Heat stability is evaluated employing the procedure previously described with the following results:

| Time | 5 minutes | 10 minutes | 20 minutes | 40 minutes | 60 minutes |
|---|---|---|---|---|---|
| MFR | 6.9 | 6.3 | 6.4 | 5.7 | 4.0 |
| % change | | −7.7 | −7.0 | −17.6 | −41.6 |

A compression molded sample of the polymer has a rupture strength of 1126 pounds per square inch and an ultimate elongation of 1300 percent.

EXAMPLE 5

A difunctional organolithium initiator solution is prepared under a nitrogen atmosphere by reacting a solution of 0.156 grams of 1,3-bis(1-phenylethenyl)-benzene dissolved in 22.3 milliliters of toluene with 2.2 milliliters of 0.552 normal secondary-butyllithium solution in cyclohexane at room temperature for a period of 1 hour. One milliliter of isoprene is added and the solution is heated to a temperature of 70–75 degrees centigrade for a period of 10 minutes. At the end of the 10-minute period, the initiator solution is charged to a nitrogen purged 1-liter glass polymerization reactor containing a mixture of 400 milliliters of dry toluene, 70 milliliters of a mixture of mixed isomers of 1,3-pentadiene, 0.5 milliliters of styrene and 3.5 grams of butadiene. At the time of addition of the initiator, the contents of the 1-liter polymerization reactor are at a temperature of 60 degrees centigrade. Thirty minutes after the addition of the initiator, styrene monomer is continually added at a rate of about 1 milliliter per hour for a period of 3 hours. At the end of the 3-hour period, the temperature of the reactor contents is increased to 65 degrees centigrade and the styrene addition rate is increased to 15 milliliters per hour for a period of 2 hours. When the addition of styrene is stopped, the mixture is maintained at 65 degrees centigrade for an additional hour and then glacial acetic acid is added to terminate the polymerization. The polymer is recovered by precipitation in methanol and is vacuum dried. The yield of polymer is almost quantitative. The resultant polymer was a block copolymer of ACBCA structure wherein A represents blocks of styrene and 1,3-pentadiene copolymer rich in styrene; C represents blocks of styrene and 1,3-pentadiene copolymer rich in 1,3-pentadiene; and B is a polybutadiene block.

A compression molded sample of the polymer has a tensile strength of 1038 pounds per square inch and an ultimate elongation of 1392 percent.

COMPARATIVE EXAMPLE B

A 1 liter glass reactor is purged with nitrogen and charged with 400 milliliters of dry toluene and 20 milliliters of purified styrene. The reaction mixture is degassed and heated to 50 degrees centigrade. On reaching 50 degrees centigrade, 1.8 milliliters of 0.58 normal secondary-butyllithium solution in cyclohexane is added to initiate styrene polymerization. 45 minutes after addition of the initiator, the reaction mixture is cooled by surrounding the reactor with ice water. The reactor is subsequently charged with 12.3 grams of 1,3-butadiene and 90 milliliters of the mixed isomer mixture of 1,3-pentadiene for the formation of the center (elastomeric) block. The mixed isomer mixture of 1,3-pentadiene employed is purified by passing twice through an activated alumina column and treated with dibutylmagnesium prior to distillation. The butadiene monomer is treated by passing first through a column packed with the potassium form of a strong acid ion exchange resin and subsequently through a column of activated alumina.

After the addition of the conjugated dienes, the reaction mixture is then heated to a temperature within a range of between 50–60 degrees centigrade for a period of 4 hours. At the end of the 4 hour period, 2.5 milliliters of a phenylbenzoate solution is added as a coupling agent. The phenylbenzoate solution contains 0.6 grams of phenylbenzoate in 10 milliliters of toluene. The reaction mixture is maintained at 50 degrees centigrade for an additional hour at which time the resultant polymer is recovered by precipitation in methanol and dried under vacuum.

During polymerization of the center block, samples are withdrawn from the reactor and analyzed by gas chromatography. The results at various time are indicated below:

| Time hours | Butadiene moles/liter | Trans-1,3-pentadiene moles/liter | Cis-1,3-pentadiene moles/liter |
|---|---|---|---|
| 0 | .43 | 1.11 | .58 |
| 1 | .05 | 1.02 | .58 |
| 2 | .01 | .91 | .58 |
| 3 | 0 | .75 | .55 |

The results of the analyses clearly indicate that butadiene is polymerized to form a polybutadiene block and subsequently a poly(1,3-pentadiene) block is formed.

There was no indication obtained that cis-1,3-pentadiene entered into the polymerization in any significant quantities.

The resultant polymer obtained is of the ABCBA structure where A is a polystyrene block, B is a polybutadiene block and C is a poly(1,3-pentadiene) block. The amount of styrene contained in the polymer is determined to be 36.3 weight percent and the butadiene to 1,3-pentadiene ratio by weight is 38.7 to 61.3.

A compression molded sample has a rupture strength of 2100 pounds per square inch and an ultimate elongation of 1110 percent.

EXAMPLE 6

A difunctional organolithium initiator solution is prepared under a nitrogen atmosphere by reacting 0.143 gram of 1,3-bis(1-phenylethenyl)benzene in 22.1 milliliters of toluene with 1.9 milliliters of 0.532 normal secondary-butyllithium cyclohexane solution at room temperature for a period of 1.5 hours. At the end of the 1.5 hour period, 1 milliliter of isoprene is added to the solution and the solution heated to a temperature of from 70–75 degrees centigrade for a period of 15 minutes. At the end of the 15-minutes period, the solution is charged to a nitrogen purged 1 liter glass reactor containing 400 milliliters of dry toluene and 30 milliliters of the mixed isomer mixture of 1,3-pentadiene. The temperature of the reaction mixture is 53 degrees centigrade. Polymerization is permitted to proceed for a period of 2 hours after the addition of the initiator whereupon 10 milliliters of styrene is added and the reaction mixtue heated to 60 degrees centigrade. One hour after the addition of the 10 milliliters of styrene, 40 milliliters of styrene is added and the polymerization continued for an additional 2 hours. At the end of the 2 hour period, glacial acetic acid is added to terminate the reactive polymer chains. The polymer is recovered by precipitation in methanol and vacuum dried. The polymer was a penta-block copolymer of ACBCA structure wherein A is a block of styrene and 1,3-pentadiene copolymer rich in styrene; C is a block of styrene and 1,3-pentadiene copolymer rich in 1,3-pentadiene; and B is a block of poly(1,3-pentadiene). The reaction mixture during the polymerization is sampled periodically with time 0 being the time of the difunctional initiator addition. The samples are analyzed by gas chromatography with the following results:

| Time hours | Trans-1,3-pentadiene moles/liter | Cis-1,3-pentadiene moles/liter | Styrene moles/liter |
|---|---|---|---|
| 0 | .43 | .23 | 0 |
| 1 | .35 | .20 | 0 |
| 2 | .33 | .20 | .19 |
| 3 | .20 | .13 | .09 |
| 4 | .05 | .03 | .04 |
| 5 | 0 | 0 | 0 |

Polymerization is complete at the end of 5 hours. The final composition is 68.8 weight percent styrene and 31.2 percent pentadiene.

Heat stability is determined by melt flow rate as in Example 2 and the results are as follows:

| Time | 5 minutes | 10 minutes | 20 minutes | 40 minutes | 60 minutes |
|---|---|---|---|---|---|
| MFR | 5.0 | 4.8 | 4.8 | 5.0 | 5.2 |
| % change | | 5.2 | −4.6 | −.4 | +3.2 |

A compression molded sample has a tensile strength of 1820 pounds per square inch and an elongation at break of 60 percent.

As shown in the aforementioned examples and the associated comparative examples, the cis-isomer of 1,3-pentadiene is extremely slow in the polymerization reaction, almost to the point of being an inert compound present in the reaction mixture during the formation of these block copolymers.

Utilizing a polymerization promoter added continuously or incrementally for the cis-isomer of 1,3-pentadiene, a hydrocarbon solvent having essentially no polar solvents present or added and specific temperature ranges, the cis-isomer of 1,3-pentadiene polymerization rate and the total overall mixed isomer 1,3-pentadiene rate is increased, thus resulting in increased, even quantitative yields of 1,3-pentadiene based on total 1,3-pentadiene.

The block copolymers of the present invention, due to good heat stability, are good thermoplastic elastomers and may be formulated into superior hot-melt adhesives and sealants able to withstand heating for a period of time prior to use.

The representative examples and details have been shown for the purpose of illustrating the invention. It will be apparent to those skilled in the art that various changes and modifications may be made therein without departing from the spirit or scope of the invention.

What is claimed is:

1. In a process for preparing block copolymers from vinyl-substitued aromatic monomers and conjugated diene monomers in the absence of air and moisture, the presence of heat, a hydrocarbon solvent and an organolithium initiator, one of the conjugated diene monomers being a mixture of cis and trans-isomers of 1,3-pentadiene, the improvement comprises polymerizing the mixture of cis and trans-isomers of 1,3-pentadiene in the presence of a hydrocarbon solvent having no added aprotic solvents of a polar nature, a cis-isomer of 1,3-pentadiene polymerizing amount of a polymerization promoter, the polymerization promoter consisting essentially of a vinyl-substituted aromatic monomer added during the 1,3-pentadiene polymerization and a 1,3-pentadiene polymerization temperature of at least about 40 degrees C. but not exceeding about 60 degrees C. in the absence of added polymerization promoter or about 70 degrees C. in the presence of added polymerization promoter.

2. The process, as recited in claim 1, wherein the polymerization promoter is styrene.

3. The process, as recited in claim 1, wherein the mixture of cis and trans-isomers of 1,3-pentadiene comprises about two-thirds trans-isomer by mixture weight and about one-third cis-isomer by mixture weight.

4. The process, as recited in claim 2, wherein the strene is added continuously.

5. The process, as recited in claim 2, wherein the styrene is added incrementally.

6. The process, as recited in claim 2, wherein the styrene is added continuously.

7. The process, as recited in claim 2, wherein the styrene is added incrementally.

* * * * *